US011393197B2

(12) United States Patent
Busche et al.

(10) Patent No.: US 11,393,197 B2
(45) Date of Patent: Jul. 19, 2022

(54) SYSTEM AND METHOD FOR QUANTIFYING AUGMENTED REALITY INTERACTION

(71) Applicant: Cvent, Inc., Tysons Corner, VA (US)

(72) Inventors: Chad Busche, Tysons Corner, VA (US); Mark Iris, Tysons Corner, VA (US); Stuart Thompson, Tysons Corner, VA (US); Bill Dwyer, Tysons Corner, VA (US); Bhaskar Athmanathan, Tysons Corner, VA (US)

(73) Assignee: Cvent, Inc., Tysons Corner, VA (US)

( * ) Notice: Subject to any disclaimer, the term of this patent is extended or adjusted under 35 U.S.C. 154(b) by 0 days.

(21) Appl. No.: 16/725,438

(22) Filed: Dec. 23, 2019

(65) Prior Publication Data

US 2020/0349352 A1 Nov. 5, 2020

Related U.S. Application Data

(60) Provisional application No. 62/842,828, filed on May 3, 2019.

(51) Int. Cl.
*G06V 20/20* (2022.01)
*H04L 67/50* (2022.01)
*G06V 20/40* (2022.01)

(52) U.S. Cl.
CPC .............. *G06V 20/20* (2022.01); *H04L 67/22* (2013.01); *G06V 20/46* (2022.01)

(58) Field of Classification Search
None
See application file for complete search history.

(56) References Cited

U.S. PATENT DOCUMENTS 8,849,700 B2 9/2014 Kamei et al.
10,488,215 B1 * 11/2019 Yu ...................... G01C 21/3632
10,699,488 B1 * 6/2020 Terrano .................. G06N 20/00
2010/0309225 A1 12/2010 Gray et al.
2013/0249947 A1 9/2013 Reitan (Continued)

OTHER PUBLICATIONS

R. R. Syed and S. Rasool, "A Framework for Cardboard Based Augmented Reality," 2018 International Conference on Frontiers of Information Technology (FIT), 2018, pp. 287-292, doi: 10.1109/FIT.2018.00057. (Year: 2018).*

(Continued)

*Primary Examiner* — James A Thompson
(74) *Attorney, Agent, or Firm* — Jeffri A. Kaminski; Venable LLP

(57) ABSTRACT

Systems, methods, and computer-readable storage media for quantifying augmented reality interaction. An exemplary system can be configured to capture, via a camera of a mobile computing device, a video feed, and extract, via a processor of the mobile computing device, an image from the video feed. The system can then determine, via the processor, that the image corresponds to a stored image in a plurality of stored images stored in an image database, resulting in a determination, and retrieve, via the processor and based on the determination, interactive content associated with the stored image. The system can then display, via a display of the mobile computing device, the interactive content as an augmented reality overlay.

20 Claims, 7 Drawing Sheets

(56) References Cited

U.S. PATENT DOCUMENTS

| | | | |
|---|---|---|---|
| 2014/0078174 | A1 | 3/2014 | Williams et al. |
| 2014/0225924 | A1 | 8/2014 | Loxam et al. |
| 2018/0089904 | A1* | 3/2018 | Jurgenson ............... G06T 19/20 |
| 2019/0226866 | A1* | 7/2019 | Chang ................... G06T 19/006 |
| 2019/0294895 | A1* | 9/2019 | Kleen ................ G02B 27/0101 |
| 2019/0371067 | A1* | 12/2019 | Simari ...................... G06T 7/75 |
| 2020/0066046 | A1* | 2/2020 | Stahl ..................... G06T 19/006 |
| 2020/0228774 | A1* | 7/2020 | Kar ....................... G06T 15/005 |
| 2020/0249819 | A1* | 8/2020 | Berquam ............ G06F 3/04815 |

OTHER PUBLICATIONS

G. Schall et al., "3D tracking in unknown environments using on-line keypoint learning for mobile augmented reality," 2008 IEEE Computer Society Conference on Computer Vision and Pattern Recognition Workshops, 2008, pp. 1-8, doi: 10.1109/CVPRW.2008.4563134. (Year: 2008).*

International Search Report and Written Opinion in corresponding International Application No. PCT/US2020/031299 dated Jul. 14, 2020 (16 pages).

* cited by examiner

SYSTEM AND METHOD FOR QUANTIFYING AUGMENTED REALITY INTERACTION

BACKGROUND

1. Technical Field

The present disclosure relates to augmented reality, and more specifically to providing augmented reality displays and quantifying the interaction with those augmented reality displays.

2. Introduction

Augmented Reality (AR) is a superimposed image on a user's view of the real world, resulting in a composite view. For example, a smartphone may capture a video feed of the real world using a camera, display the video feed on the smartphone display, and add additional visuals or information over the video feed. As AR becomes more common, a challenge can be identifying how users interact with AR displays and models. For example, advertisers, sponsors, or other entities helping generate the AR content would like to know when and how users are interacting with the AR content.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An exemplary method performed according to this disclosure can include: capturing, via a camera of a mobile computing device, a video feed; extracting, via a processor of the mobile computing device, an image from the video feed; determining, via the processor, that the image corresponds to a stored image in a plurality of stored images stored in an image database, resulting in a determination; retrieving, via the processor and based on the determination, interactive content associated with the stored image; and displaying, via a display of the mobile computing device, the interactive content as an augmented reality overlay.

An exemplary system configured according to this disclosure can include: a processor; a camera; a display; and a non-transitory computer-readable storage medium having instructions stored which, when executed by the processor, cause the processor to perform operations comprising: capturing, via the camera, a video feed; extracting an image from the video feed; determining that the image corresponds to a stored image in a plurality of stored images stored in an image database, resulting in a determination; retrieving, based on the determination, interactive content associated with the stored image; and displaying, via the display, the interactive content as an augmented reality overlay.

Exemplary non-transitory computer-readable storage media configured according to this disclosure can have instructions stored which, when executed by a computing device, cause the computing device to perform operations including: receiving, from a camera, a video feed; extracting an image from the video feed; determining that the image corresponds to a stored image in a plurality of stored images stored in an image database, resulting in a determination; retrieving, based on the determination, interactive content associated with the stored image; and displaying, via a display, the interactive content as an augmented reality overlay.

DETAILED DESCRIPTION

Figure 1:
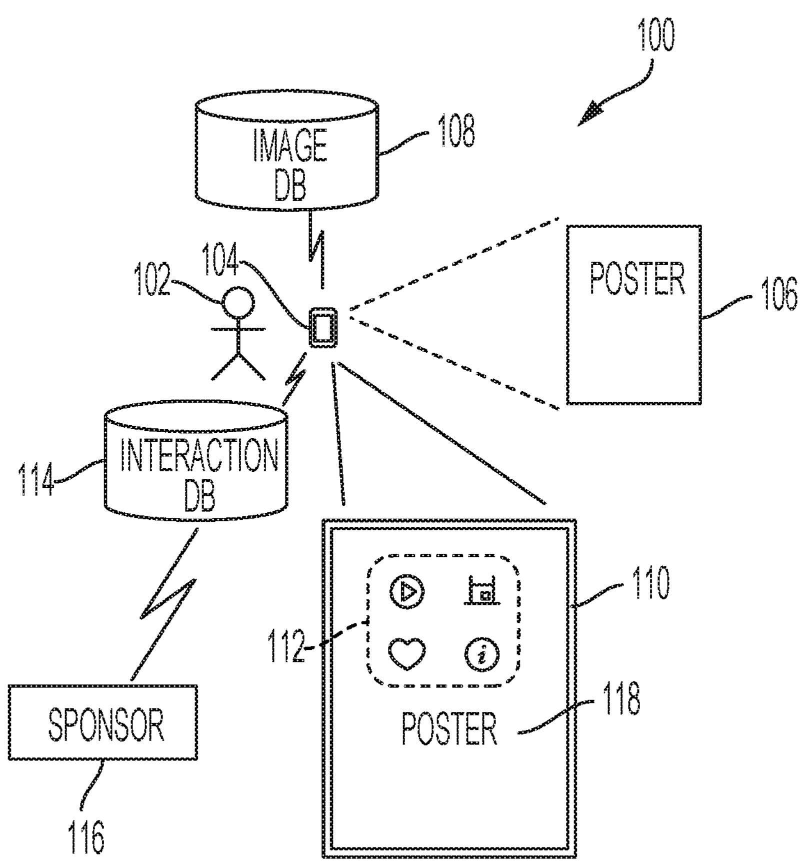
FIG. 1 illustrates a first example system for interacting with AR.

Various embodiments of the disclosure are described in detail below. While specific implementations are described, it should be understood that this is done for illustration purposes only. Other components and configurations may be used without parting from the spirit and scope of the disclosure.

The disclosed systems, methods, and computer-readable storage media use Augmented Reality (AR) to improve customization of information being provided to users. The graphics and animations displayed to the user can vary based on location as well as based on the specific circumstances, preferences, and needs of the user. As the user moves, or as time progresses, the interactive content being presented to the user can be modified and adjusted. Exemplary, non-limiting devices with which a user can deploy the AR configurations disclosed herein can include smartphones, tablet computers, smart glasses (glasses with an optical head-mounted display in the shape of eye glasses), smart contact lenses (contact lenses with the ability to project graphics), or other mobile computing device with a camera, processor, and display mechanism.

Consider the following example. A user is at a conference and receives a business card. The business card is associated with interactive AR content, meaning that when viewed through an AR configured mobile computing device, interactive AR content appears on the mobile computing device display. The user views the business card using their smartphone (which is configured to view AR content), and the smartphone graphically displays AR content associated with the business card. If, for example, the owner of the business card were a lion trainer, the business card could, when viewed through an AR configured device, cause the AR configured device to display an animated lion on top of the business card in the device display. As the user of the device walks around the card, or rotates the card, the orientation of the displayed lion can rotate as well. In other words, in this example the orientation of the displayed lion can vary based on the respective orientation of the AR configured device to the business card.

As another example, a user at a conference can approach a poster which, in "real life" states "When is my next session?" As the AR device camera pans over the poster, the image of the poster is recognized by the AR device and interactive content associated with the poster is displayed on the AR device display. In this example, the interactive content is a map which is specifically tailored to the user, and the map illustrates the route which the user should follow to their next scheduled session.

As yet another example, a user can approach a small 3D (three dimensional) trinket, toy, or other object. As the AR device camera pans over the 3D trinket, interactive content associated with the 3D trinket can be displayed. For example, if the 3D trinket is a miniature tractor, an interactive, 3D tractor could be displayed on the AR device display. As the user walks, pivots, or otherwise moves around the trinket, the angle of the 3D tractor displayed on the AR device display rotates or moves. If the user moves closer or moves away, the scale of the displayed 3D tractor can increase or decrease accordingly.

As yet another example, the user can approach an object (such as a poster, sign, or other object), and the AR device, upon detecting the poster, can display content which changes or varies based on specific circumstances. For example, the content could change based on the user of the AR device, the time of day, location, angle to the object, pseudo-random variables, etc.

One example of interactive content which could be displayed could be a television, movie, or other video content. As the user moves or adjusts position, the angle of the "virtual" video content being displayed only on their AR device can likewise move. In effect, the user is viewing a personalized movie through their device which other individuals do not see. In some configurations, the user can then pause, rewind, or otherwise control the video content being displayed.

Another example of interactive content which could be displayed could be a live TWITTER feed. For example, if the user is at a conference and views an object which instigates a display of AR content on the AR device, that AR content displayed could be a live TWITTER feed associated with the conference. As the user continues to view the object through the AR device, the user can interact (scroll, highlight, view specific tweets, etc.) with the displayed feed.

Another example of interactive content could be directions to a destination or location. For example, the user could look at an object which generates, using the current location and heading (e.g., cardinal direction of orientation) of the AR device, an AR map for the user to follow to a destination. As the user turns to follow the directions, the AR device can generate AR arrows (virtually displayed on the ground, on walls, in the air, etc.) for the user to follow to their destination. If the user deviates from the predetermined course while enroute, the system can automatically adjust the virtual arrows based on an updated location. If the user were to walk away from the instigating object which cause the map to be generated, and then turned back toward the instigating object, the map could be scaled to a smaller size based on the distance of the AR device to the instigating object. The distance to the instigating object can be calculated using GPS locations of the object, the AR device, and/or the size of the image of the object (which can be determined using edges or other portions of the object).

In some configurations, the AR systems disclosed herein can be used for a virtual scavenger hunt, where the users follow clues which are displayed to the user by the AR device upon the user finding and panning the AR device camera over a particular object. While in some such configurations the clues may appear anytime any object in the scavenger hunt is detected, in other configurations the objects must be detected in a particular order. For example, if a user is supposed to follow the clue from a first point to a second point where they will receive a subsequent clue, etc., subsequent clues may not appear unless obtained in the correct order or sequence.

In some configurations, the AR systems disclosed herein can be used for virtual gambling or slot machines using pseudo-random content. For example, a user can approach a location of an object which, when panned over by a camera of an AR device, causes the AR device to display a slot machine (or roulette table, etc.). The AR device can then use pseudo-random numbers to allow the user to engage in virtual gambling using the AR generated slot machine, roulette table, or other gambling content.

Exemplary objects which, when identified within images captured by an AR device can include items such as posters, cards, 3D items, and/or other markers. When a known marker/object is found, the software executed by the AR device responds by displaying one or more virtual elements over the top of the video feed, with the virtual elements rendered to appear as part of the real world. In some configurations, the virtual elements can be interacted with by the user touching the display on the AR device where the virtual elements are displayed. In other configurations, the user can interact with the virtual elements by moving their hands into the field of vision of the AR device camera, allowing the user to pretend to touch the objects being displayed. In some cases, the content displayed may not be interactive, such that the user cannot interact or modify the content being displayed. In yet other cases, a portion of the content may be interactive while a remainder portion is not interactive.

In some cases, the displayed animation or graphics can be in the form of a virtual billboard containing a feed of data, such as data produced by social media websites or photo walls. These feeds can display content relevant to the user viewing them based on the device identification of the AR device being used to view the AR content, or by user identifications where the user logged into an account, or otherwise identified themselves, on the AR device. Filters can be applied to tailor the content to the user, allowing the content to change dynamically throughout the day, change based on location at which a marker is scanned or identified, etc. As a further example, a poster could represent an image marker/object which, when scanned by an AR device, is replaced on the display of the AR device by a board showing a live TWITTER feed. This virtual TWITTER board is a computer-generated image updated at a framerate sufficient to give the illusion of a digital video feed. The feed shows only tweets relevant to the user, such as tweets related to an event, preferences of the user, etc.

Exemplary ways in which the content can be tailored to the user can include presenting content specific to the user's location (e.g., a TWITTER feed of content with a hashtag associated with an event occurring at the user's location), presenting content based on the user's demographic data (e.g., presenting an advertisement specific to the user's age, gender, socio-economic status, nationality, primary language, etc.), the type of AR device being used (e.g., providing different content based on the brand of the device being used to view the AR content). Likewise, if the user is looking for directions, the directions provided can be customized to the user, such that two individuals searching for directions to different subsequent destinations from a common starting point will receive distinct sets of directions. Even if both users are going to a common destination, the system may route users in distinct paths based on preferences, points of interest, etc., of the respective users. For example, if a first user has indicated that they would like to walk past certain paintings or exhibits, while a second user has indicated that they would prefer not to walk past those same exhibits, the system can provide distinct routing to the respective users.

The system can also use data aggregations coupled with machine learning to make predictions about how similar users will respond to displayed AR content and modify future content based on those correlations. For example, the system can iteratively collect data regarding user interactions with specific pieces of AR content, perform regression analysis on the interactions and known aspects about the user or user device, then modify future AR content based on the correlations. In this manner, the content tailored for a given individual can change both based on how the individual user reacts to displayed AR content over time, as well as based on how other users react to displayed AR content.

The lighting of the AR content displayed can vary based on the space where the inciting object is located. In some configurations, the goal may be for the AR content to look real. That is, the user of the AR device, looking at the display, would not be able to identify the content as virtual just by looking at the AR device display. To create convincing AR content, the system identifies how lighting is projected in the real world from the camera feed, including identifying sources of light, shades of light, reflection/refraction qualities of materials in the camera feed, etc. The system then modifies the AR content being displayed to mimic the lighting qualities of the environment, such that shadows and light of the AR content mirror physical displays.

In some cases, the system can use aspects of Lambert's law of diffuse reflectance to determine the color of a surface using the formula:

$$c=(\Sigma a_l+\Sigma d_l)*d_m$$

where:

c: color $a_l$: ambient light strength $d_l$: diffuse light strength $d_m$: diffuse material factor Likewise, in some cases the system can use aspects of Phong's lighting approximation which adds, to Lambert's equation, a specular component:

$$c=((\Sigma a_l+\Sigma d_l)*d_m)+(\Sigma s_l*s_t)$$

where additionally:

$s_l$: specular light $(R \times E)^s$ $s_t$: specular texture contribution (specular surface map)

E: normal vector from eye to surface

R: reflection vector across the normal vector

S: shininess factor (how shiny/metallic the object surface is)

The system can also use the Blinn lighting model, which uses the following specular component:

$$s_l\text{: specular light}(H \times N)^s$$

where:

H: vector midpoint between light vector and eye vector

Image recognition can, for example, occur by processing the video feed at 30, 60, or 120 frames per second, and is accompanied by detection of known images from a variety of distances, angles, and perspectives under varying lighting conditions. One or more cameras, processors, image databases, and other hardware and software elements work together to determine if an image marker has been found, and the exact reference point of that image marker with respect to the AR device. Identifying the relationship between the known location of the image marker and the current location of the AR device can require use of mathematical relationships (specifically trigonometry), and can factor into the display of the AR content.

FIG. 1 illustrates a first example system 100 for interacting with AR. In this example, the user 102 uses a smartphone 104 to view a combination of real life and artificial images placed over the view of real life within the smartphone 104 display. As the user 102 moves the smartphone 104 camera around a room or venue, the smartphone camera captures a video feed of the surroundings. As the video feed is captured, the images being captured are compared to images within an image database 108. The image database 108 can be contained within memory of the smartphone 104, within memory of a remote server, and/or a remote database. In this example, the smartphone 104 camera captures an image of a poster 106, and smartphone 104 has compared the image of the poster 106 to images within the image database 108.

When the image captured by the smartphone 104 is not found in the image database 108, the system and the smartphone 104 continue searching the video feed for matches. For example, the camera and smartphone 104 can continue scanning regardless of whether a match is found, which can result in multiple images being captures and analyzed at once/in parallel. However, as illustrated, the image of the poster 106 has been found in the image database 108, resulting in the display 110 of the smartphone (shown as an enlarged view) showing the live view of real life (in this case, the poster 118) as well as additional graphics 112 generated based on the detection of a known image. In this case, the additional graphics 112 displayed on the smartphone display 110 provide the user 102 with additional ways to interact with the poster 106. For example, the additional icons 112 can provide the user 102 with a link to additional information about the poster's content, with the ability to "favorite" or "like" the poster for future reference, the ability to make an appointment or calendar item, and/or the ability to play video content associated with the poster 106.

As the user 102 interacts (or does not interact) with the additional graphics 112, the smartphone 104 records/logs the interaction in an interaction database 114. Each detection event of an interactive display and/or interaction with associated interactive graphics can be recorded in the interaction database 114, regardless of whether or not the user 102 interacts with the displayed content. The interaction database 114 can be contained within memory of the smartphone 104, within memory of a remote server, and/or a remote database. The interactions of the user with the additional graphics 112 can then be used to inform the sponsor 116 of the poster 106 how the content is being received, interacted with, etc. In this manner, the sponsor 116 can measure the engagement and determine various metrics of value of the poster based on that engagement.

In some configurations, the system can also be location based. For example, the system can determine the user 102 location, locations of what is in the captured video, then add location-specific AR. If the smartphone 104 detects a poster 106, a card, a building, or any other object (within the image database 108) at a first location, the smartphone can display an AR object which is not only based on the detected object, but also is based on the location. In such a configuration, the smartphone 104 could display distinct overlays if the same poster 106 were detected in the United States versus in Europe. Other exemplary factors which may result in distinct overlays include time of day, specific user information, and/or pseudo-random variables (such as a random chance of certain information or variants being displayed).

Also, as an example of the location-based AR with respect to objects such as physical buildings, the system can overlay colors, information, advertising, etc., upon detecting known objects. For example, when a user visits the coliseum in Rome, the smartphone 104 may detect the user's location (or more precisely, the location of the user's smartphone 104), then as the camera scans the real-world view of the coliseum, create an overlay of (1) how the coliseum would have looked in ancient times, and (2) interactive elements associated with the overlay.

Figure 2:
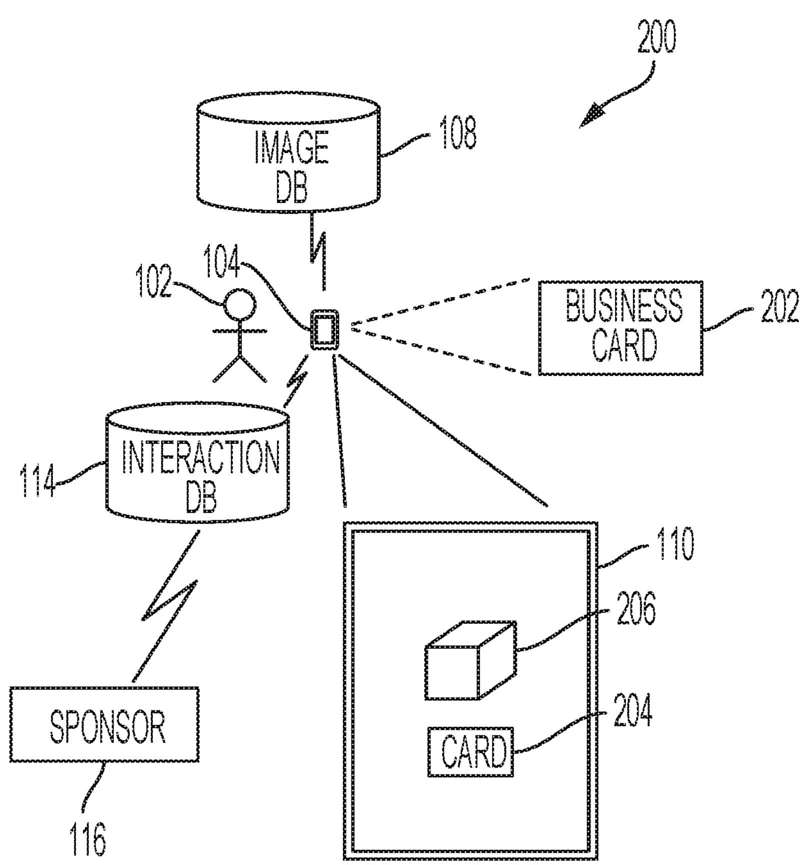
FIG. 2 illustrates a second example system for interacting with AR.

FIG. 2 illustrates a second example system 200 for interacting with AR. This example 200 uses the same overall system configuration as that of FIG. 1—a user 102 interacting with a smartphone 104 which captures a video feed of surroundings using the smartphone 104 camera, checking images of the video feed against images in an image database 108, and recording interactions with AR content in an interaction database 114 such that a sponsor 116 of the AR content can measure engagement. In this example 200, the user's 102 smartphone 104 has captured a business card 202, and an image from the video feed of that business card 202 is recognized as being stored within the image database 108. In this case, the smartphone display 110 displays the "real life" view of the business card 204 with an overlaid three-dimensional object 206 based on the business card. In this case, the overlaid three-dimensional object 206 is a cube. As another example, if the business card (or poster, or coaster, or other detectable object) were related to a particular real-world object, such as a car, the three-dimensional object 206 could be of the car.

Figure 3:
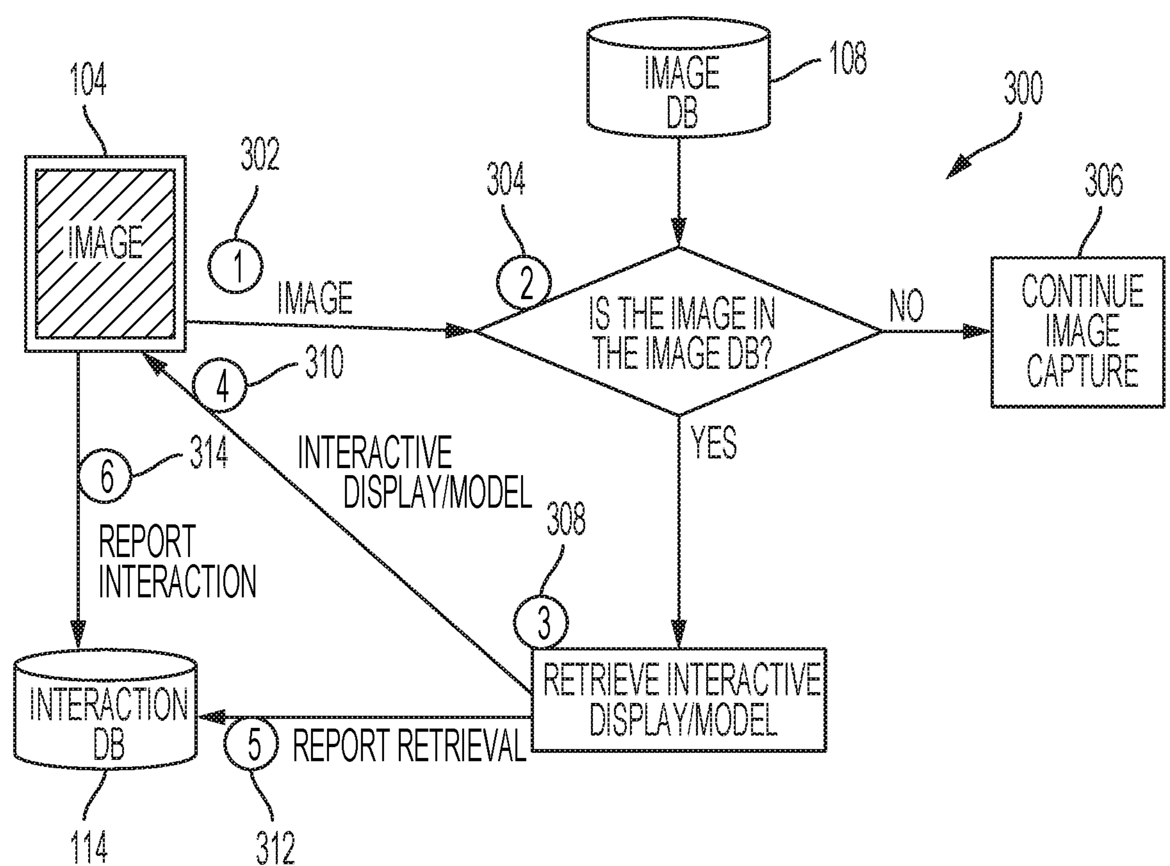
FIG. 3 illustrates example backend processing of AR.

FIG. 3 illustrates example backend processing of AR according to an embodiment of the disclosed invention. In this example, the smartphone 104 captures an image (302) of real life which is displayed on the smartphone display. The system determines if the image is stored in the image database 108 (304). If the image is not stored in the image database 108, the system/smartphone 104 continues with the image capture (306). If the image is contained within the image database, the system retrieves interactive displays/models (308) and uploads those interactive elements to the smartphone 104 display (310). The interactive displays/models retrieved can be stored in a database within memory of the smartphone or in an exterior database (such as one connected through the Internet). The system can also record that the interactive elements have been retrieved (312) into an interaction database 114. Likewise, as the user interacts with the interactive elements displayed on the smartphone 104 display, the interactions can also be recorded in the interaction database (314). In addition, both the detection of interactive elements and/or the interactions can be sent to a real-time analytics and data processing system, which can modify or change interactive elements of future (or currently displayed) AR interactions for the user or for others.

In some configurations, the system can include gamification, such as collecting items to meets goals, displaying different content depending on the number of items collected, placing AR objects in certain areas of a room to direct traffic, and/or modifying content to redirect traffic. For example, a user can be directed to "collect" certain content, which can be accomplished by the camera detecting predetermined objects and displaying associated AR content. The system can record that the user has displayed the AR content and thereby "collected" the objects. When the user has collect all of the objects (or a certain portion of the objects), the system can modify the interactive content being displayed or otherwise reward the user in some manner.

Figure 4A:
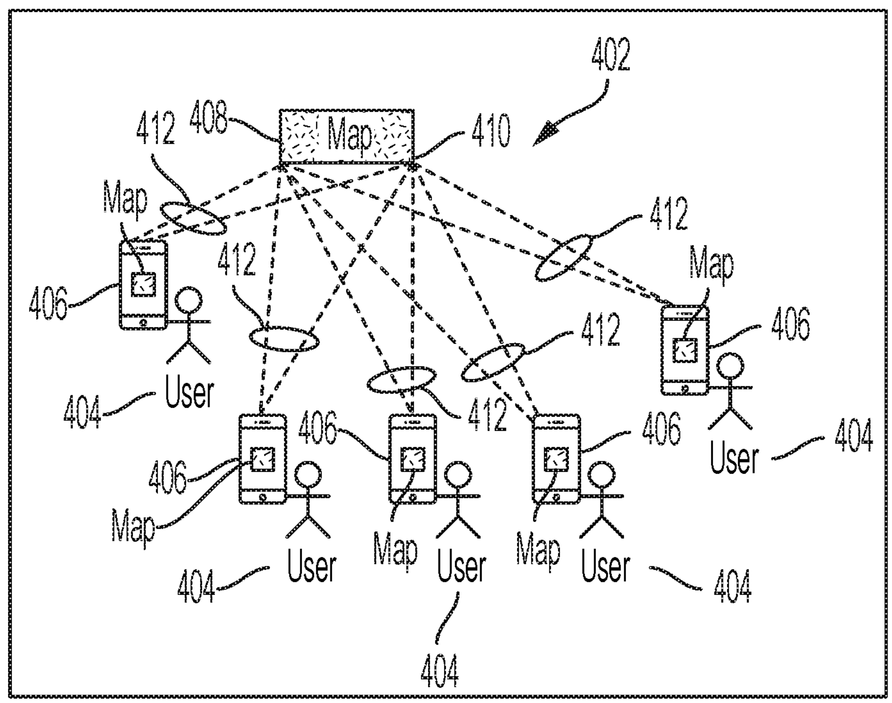
FIG. 4A illustrates a first example of determining orientation of a device to a known object.

FIG. 4A illustrates a first example of determining orientation of a device to a known object 402. In this example, multiple users 404 are gathered around a known object 402 (a map), having a known location and known dimensions 408, 410 (illustrated as the edges of the map 402). The devices 406 (illustrated as smartphones) of the users 404 use cameras to view the object 402, extract images out of the camera feed to identify the object, calculate the angles or dimensions 412 of the captured object 402 relative to the devices 406, and display AR related content on the display of the user devices 406 based on those angles 412 and/or the distance of the device 406 to the fixed object 402.

Figure 4B:
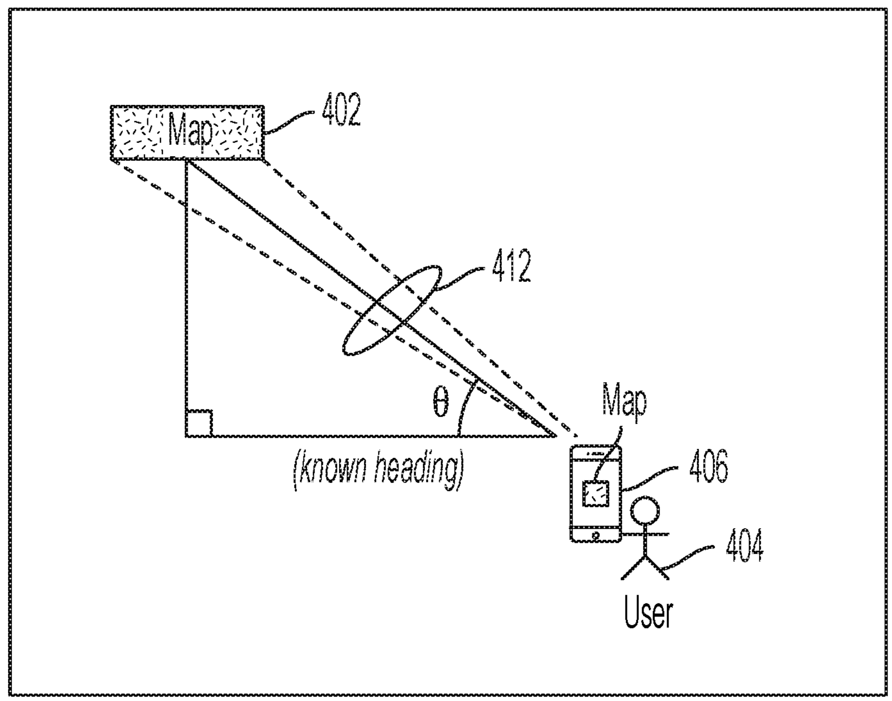
FIG. 4B illustrates a second example of determining orientation of a device to a known object.

FIG. 4B illustrates a second example of determining orientation of a device 406 to a known object 402. In this example, the user 404 is standing a certain distance from the fixed object 402, and the heading (the direction in which the device 406 is pointing) is known. The device 406 can capture an image (preferably from a video feed) of the object 402, and from that image measure the angles 412 or dimensions of the captured object 402. Using the angles 412, and the known, fixed attributes (dimensions, orientation, location, etc.) of the fixed object 402, the device 406 can calculate the distance between the fixed object 402 and the device 406, as well as the angle of orientation between the fixed object 402 and the device 406. In some configurations, the device 406 can also determine its location using GPS (Global Positioning System) or triangulation mechanisms.

Figure 5:
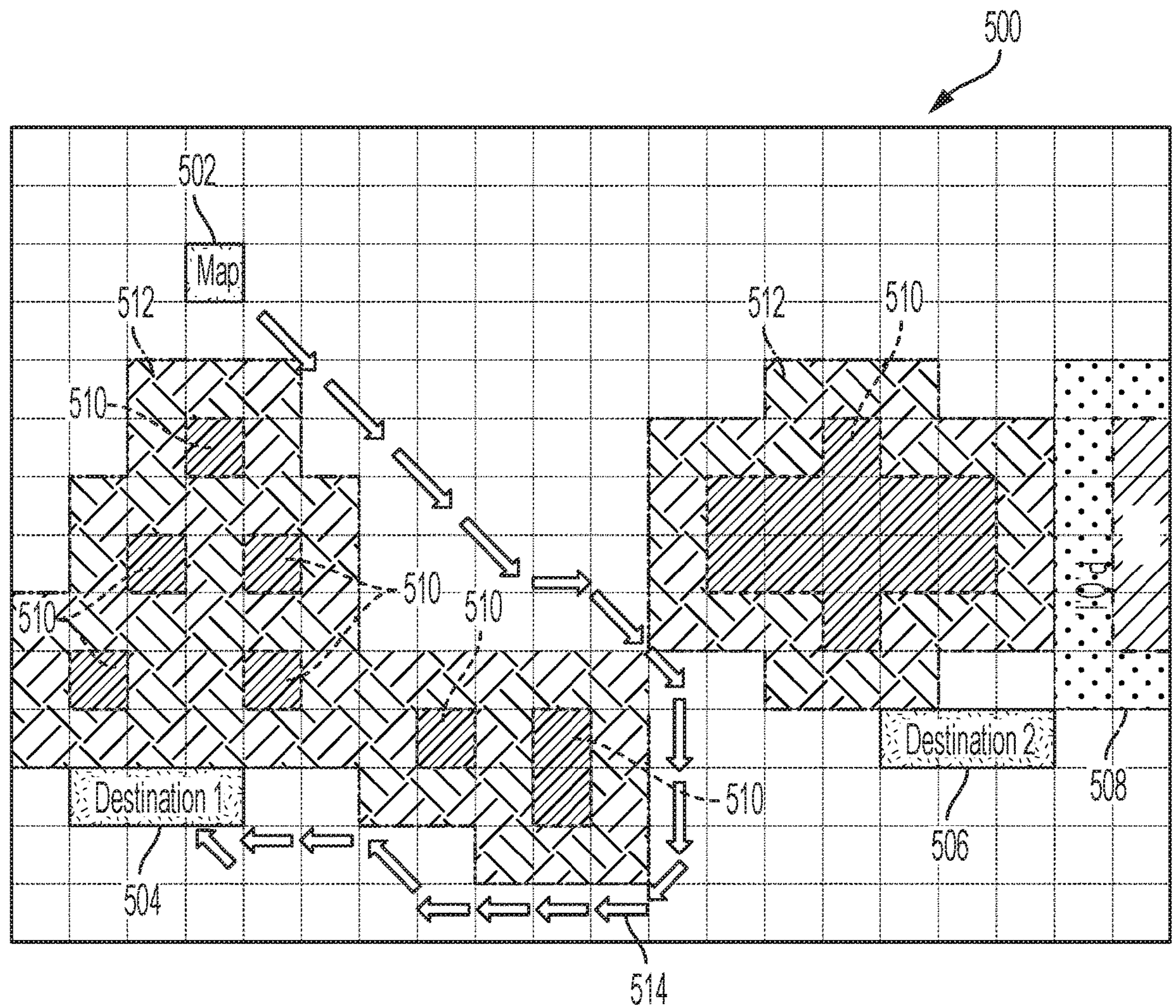
FIG. 5 illustrates an example of route planning.

FIG. 5 illustrates an example of route planning 500. In this example, the system plans a route 514 for a user from a starting location 502 to a destination 504 while navigating around obstacles 510 while aware of other destinations 506 or points of interest 508. In addition to identifying the most efficient route for the user, the system also considers partially obstructed areas 512 surrounding known obstructions 510. For example, around furniture, counters, tables, etc., there may be people, stored items, and other objects which can impede a user walking nearby. Systems configured as disclosed herein can adjust for those potential impediments, instructing the user to navigate around and/or away from those potential problems by a minimum measurement.

Figure 6:
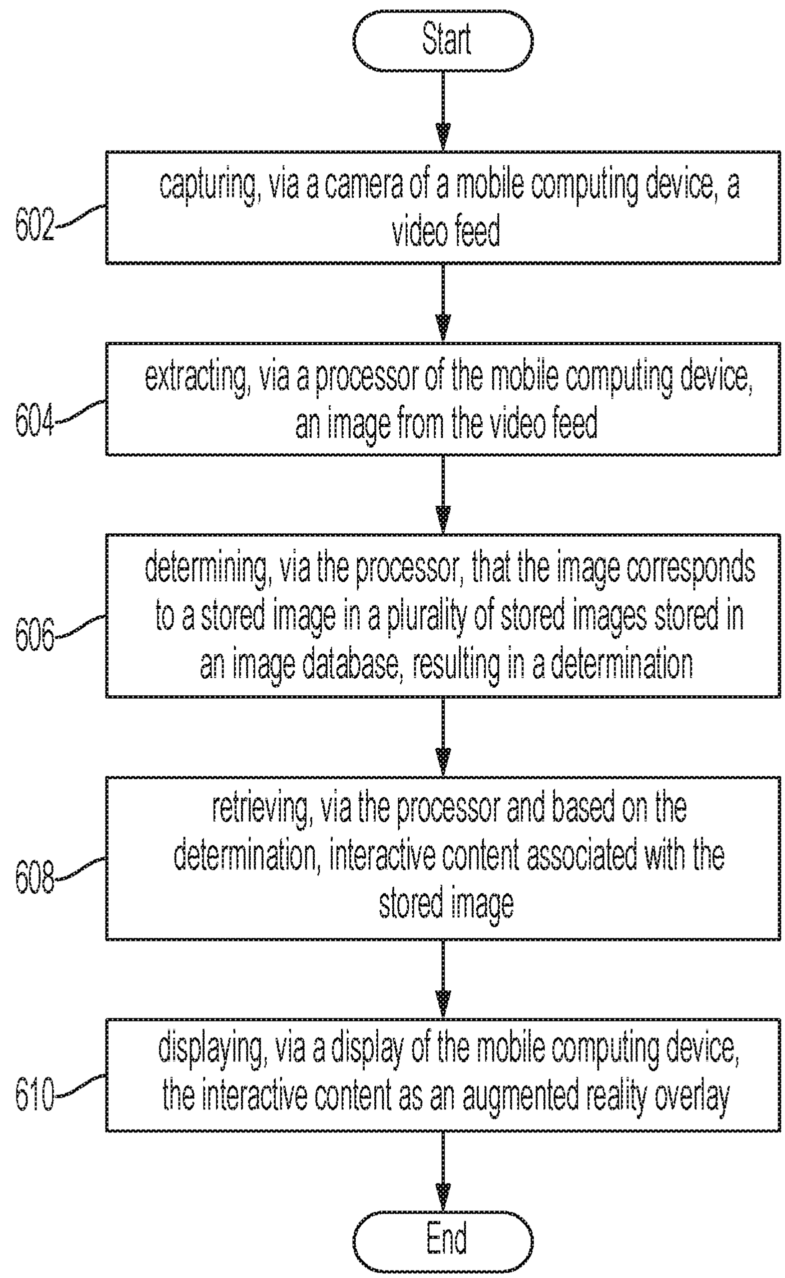
FIG. 6 illustrates an example method embodiment.

FIG. 6 illustrates an example method embodiment. In this example a mobile computing device (such as a smartphone, smart glasses, a tablet computer, or smart contact lenses) performs the illustrated method. The method includes capturing, via a camera of a mobile computing device, a video feed (602) and extracting, via a processor of the mobile computing device, an image from the video feed (604). The processor determines that the image corresponds to a stored image in a plurality of stored images stored in an image database, resulting in a determination (606) and retrieves, via the processor and based on the determination, interactive content associated with the stored image (608). Then the interactive content is displayed, via a display of the mobile computing device, as an augmented reality overlay (610).

In some configurations, the image database can be located within the mobile computing device. That is, the image database can be a portion of a hard drive or memory device located within the mobile computing device. In other configurations, the image database can be located remotely from the mobile computing device. In such configurations, the illustrated method can further include transmitting the image across a network from the mobile computing device to a remote computing system which contains the image database, and receiving, from the remote computing system, a confirmation that the image is stored in the image database.

In some configurations, the illustrated method can further include identifying, via an onboard compass of the mobile computing device, a current heading of the mobile computing device; identifying, via the processor, a scale of the image relative to the stored image; and modifying, via the processor, the interactive content displayed on the display based on the current heading and the scale. Exemplary modifications can include changing a size of the interactive content displayed based on the scale and/or changing an angle of the interactive content displayed based on the current heading.

In some configurations, the interactive content can include a map and/or directions to a subsequent destination, and the method can then further include: detecting movement of the mobile computing device, the movement comprising at least one of a change of location or a change of direction, and modifying at least one of the map or the directions based on the at least one of the change of location or the change of direction.

In some configurations, the illustrated method can further include: tracking, via the processor, interactions with the interactive content by a user of the mobile computing device; and transmitting, from the mobile computing device to a server, the interactions, wherein: the server aggregates the interactions with interactions of other users, resulting in aggregated user interactions; and modifies the interactive content on the mobile computing device based on the aggregated user interactions. In such configurations, the interactive content can be stored within the server, and the retrieving of the interactive content by the processor can further include: transmitting, from the processor to the server across a network, a request for the interactive content; and receiving, in response to the request, at the processor from the server across the network, the interactive content.

In some configurations, the interactive content can be stored within a database of the mobile computing device.

Figure 7:
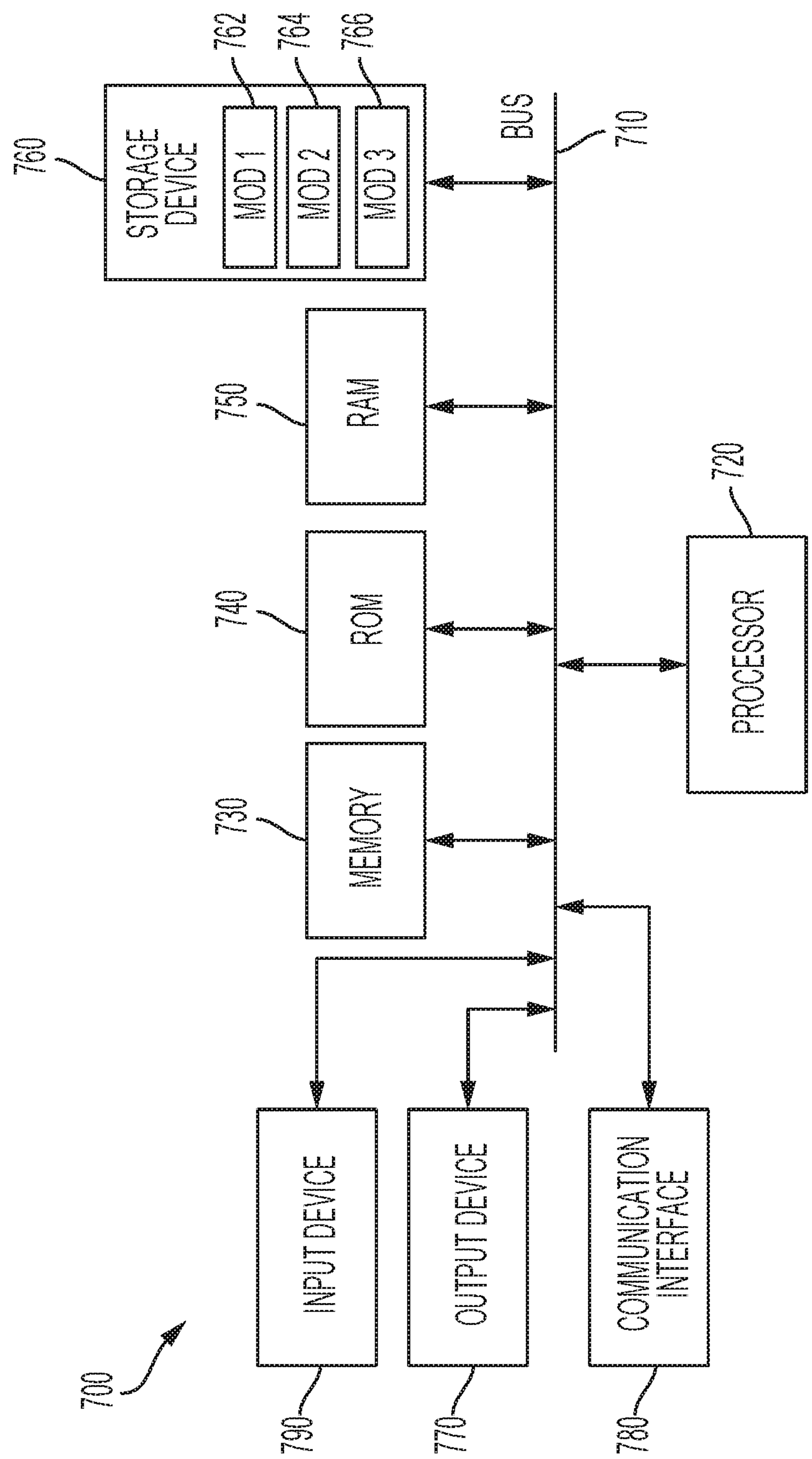
FIG. 7 illustrates an example computer system.

With reference to FIG. 7, an exemplary system includes a general-purpose computing device 700, including a processing unit (CPU or processor) 720 and a system bus 710 that couples various system components including the system memory 730 such as read-only memory (ROM) 740 and random access memory (RAM) 750 to the processor 720. The system 700 can include a cache of high-speed memory connected directly with, in close proximity to, or integrated as part of the processor 720. The system 700 copies data from the memory 730 and/or the storage device 760 to the cache for quick access by the processor 720. In this way, the cache provides a performance boost that avoids processor 720 delays while waiting for data. These and other modules can control or be configured to control the processor 720 to perform various actions. Other system memory 730 may be available for use as well. The memory 730 can include multiple different types of memory with different performance characteristics. It can be appreciated that the disclosure may operate on a computing device 700 with more than one processor 720 or on a group or cluster of computing devices networked together to provide greater processing capability. The processor 720 can include any general purpose processor and a hardware module or software module, such as module 1 762, module 2 764, and module 3 766 stored in storage device 760, configured to control the processor 720 as well as a special-purpose processor where software instructions are incorporated into the actual processor design. The processor 720 may essentially be a completely self-contained computing system, containing multiple cores or processors, a bus, memory controller, cache, etc. A multi-core processor may be symmetric or asymmetric.

The system bus 710 may be any of several types of bus structures including a memory bus or memory controller, a peripheral bus, and a local bus using any of a variety of bus architectures. A basic input/output (BIOS) stored in ROM 740 or the like, may provide the basic routine that helps to transfer information between elements within the computing device 700, such as during start-up. The computing device 700 further includes storage devices 760 such as a hard disk drive, a magnetic disk drive, an optical disk drive, tape drive or the like. The storage device 760 can include software modules 762, 764, 766 for controlling the processor 720. Other hardware or software modules are contemplated. The storage device 760 is connected to the system bus 710 by a drive interface. The drives and the associated computer-readable storage media provide nonvolatile storage of computer-readable instructions, data structures, program modules and other data for the computing device 700. In one aspect, a hardware module that performs a particular function includes the software component stored in a tangible computer-readable storage medium in connection with the necessary hardware components, such as the processor 720, bus 710, display 770, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 700 is a small, handheld computing device, a desktop computer, or a computer server.

Although the exemplary embodiment described herein employs the hard disk 760, other types of computer-readable media which can store data that are accessible by a computer, such as magnetic cassettes, flash memory cards, digital versatile disks, cartridges, random access memories (RAMs) 750, and read-only memory (ROM) 740, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 700, an input device 790 represents any number of input mechanisms, such as a microphone for speech, a touch-sensitive screen for gesture or graphical input, keyboard, mouse, motion input, speech and so forth. An output device 770 can also be one or more of a number of output mechanisms known to those of skill in the art. In some instances, multimodal systems enable a user to provide multiple types of input to communicate with the computing device 700. The communications interface 780 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:

capturing, within a video feed received via a camera of a mobile computing device, an image of an instigating object;

determining, via the processor, that the image corresponds to a stored image in a plurality of stored images stored in an image database, resulting in a determination;

retrieving, via the processor and based on the determination, interactive content associated with the instigating object, the interactive content comprising an artificial reality map illustrating a route which a user should follow to a subsequent destination and augmented reality arrows pointing to the subsequent destination;

displaying, via a display of the mobile computing device, the artificial reality map as a first augmented reality overlay;

while displaying the artificial reality map, displaying, via the display of the mobile computing device, the augmented reality arrows as a second augmented reality overlay;

detecting movement of the mobile computing device, the movement comprising a change of location, such that a distance between the mobile computing device and the instigating object has increased; and modifying at least one of the artificial reality map or the augmented reality arrows based on the change of location, such that the artificial reality map is scaled based on the distance.

2. The method of claim 1, wherein the image database is located within the mobile computing device.

3. The method of claim 1, wherein the image database is located remotely from the mobile computing device; and the method further comprises:

transmitting the image across a network from the mobile computing device to a remote computing system comprising the image database; and receiving, from the remote computing system, a confirmation that the image is stored in the image database.

4. The method of claim 1, further comprising:

identifying, via an onboard compass of the mobile computing device, a current heading of the mobile computing device;

identifying, via the processor, a scale of the image relative to the stored image; and modifying, via the processor, the interactive content displayed on the display based on the current heading and the scale.

5. The method of claim 4, wherein the interactive content is modified by at least one of changing a size of the interactive content displayed based on the scale or changing an angle of the interactive content displayed based on the current heading.

6. The method of claim 1, wherein the movement further comprises a change of direction.

7. The method of claim 1, further comprising:

tracking, via the processor, interactions with the interactive content by a user of the mobile computing device; and transmitting, from the mobile computing device to a server, the interactions, wherein:

the server aggregates the interactions with interactions of other users, resulting in aggregated user interactions; and modifies the interactive content on the mobile computing device based on the aggregated user interactions.

8. The method of claim 7, wherein the interactive content is stored within the server; and wherein the retrieving of the interactive content by the processor further comprises:

transmitting, from the processor to the server across a network, a request for the interactive content; and receiving, in response to the request, at the processor from the server across the network, the interactive content.

9. The method of claim 1, wherein the interactive content is stored within a database of the mobile computing device.

10. The method of claim 1, wherein the mobile computing device comprises at least one of a smartphone, smart glasses, or smart contact lenses.

11. A system comprising:

a processor;

a camera;

a display; and a non-transitory computer-readable storage medium having instructions stored which, when executed by the processor, cause the processor to perform operations comprising:

capturing, within a video feed received via the camera, an image of an instigating object;

determining that the image corresponds to a stored image in a plurality of stored images stored in an image database, resulting in a determination;

retrieving, based on the determination, interactive content associated with the instigating object, the interactive content comprising an artificial reality map illustrating a route which a user should follow to a subsequent destination and augmented reality arrows pointing to the subsequent destination;

displaying, via the display, the artificial reality map as a first augmented reality overlay;

while displaying the artificial reality map, displaying, via the display, the augmented reality arrows as a second augmented reality overlay;

detecting movement of the system, the movement comprising a change of location such that a distance between the system and the instigating object has increased; and modifying at least one of the artificial reality map or the augmented reality arrows based on the change of location, such that the artificial reality map is scaled based on the distance.

12. The system of claim 11, wherein the image database is located within the system.

13. The system of claim 11, wherein the image database is located remotely from the system; and wherein the non-transitory computer-readable storage medium has additional instructions stored which, when executed by the processor, cause the processor to perform operations comprising:

transmitting the image across a network to a remote computing system comprising the image database; and receiving, from the remote computing system, a confirmation that the image is stored in the image database.

14. The system of claim 11, further comprising:

an onboard compass; and wherein the non-transitory computer-readable storage medium has additional instructions stored which, when executed by the processor, cause the processor to perform operations comprising:

identifying, via the onboard compass, a current heading of the system;

identifying a scale of the image relative to the stored image; and modifying the interactive content displayed on the display based on the current heading and the scale.

15. The system of claim 14, wherein the interactive content is modified by at least one of changing a size of the interactive content displayed based on the scale or changing an angle of the interactive content displayed based on the current heading.

16. The system of claim 11, wherein the interactive content further comprises a change of direction.

17. The system of claim 11, wherein the non-transitory computer-readable storage medium has additional instructions stored which, when executed by the processor, cause the processor to perform operations comprising:

tracking interactions with the interactive content by a user of the system; and transmitting, to a server, the interactions, wherein:

the server aggregates the interactions with interactions of other users, resulting in aggregated user interactions; and modifies the interactive content on the system based on the aggregated user interactions.

18. The system of claim 17, wherein the interactive content is stored within the server; and wherein the retrieving of the interactive content further comprises:

transmitting, to the server across a network, a request for the interactive content; and receiving, in response to the request, from the server across the network, the interactive content.

19. The system of claim 11, wherein the interactive content is stored within the non-transitory computer-readable storage medium.

20. A non-transitory computer-readable storage medium having instructions stored which, when executed by a computing device, cause the computing device to perform operations comprising:

capturing, within a video feed received via the camera, an image of an instigating object;

determining that the image corresponds to a stored image in a plurality of stored images stored in an image database, resulting in a determination;

retrieving, based on the determination, interactive content associated with the instigating object, the interactive content comprising an artificial reality map illustrating a route which a user should follow to a subsequent destination and augmented reality arrows pointing to the subsequent destination;

displaying, via the display, the artificial reality map as a first augmented reality overlay;

while displaying the artificial reality map, displaying, via the display, the augmented reality arrows as a second augmented reality overlay;

detecting movement of the system, the movement comprising a change of location such that a distance between the system and the instigating object has increased; and modifying at least one of the artificial reality map or the augmented reality arrows based on the change of location, such that the artificial reality map is scaled based on the distance.

* * * * *